United States Patent [19]

Yanagihara et al.

[11] 4,114,568
[45] Sep. 19, 1978

[54] INTERNAL COMBUSTION ENGINE WITH AN AUXILIARY CHAMBER

[75] Inventors: Hiromichi Yanagihara; Nobuo Habu, both of Susono, Japan

[73] Assignee: Toyota Jidosha Kogyo Kabushiki Kaisha, Toyota, Japan

[21] Appl. No.: 799,919

[22] Filed: May 24, 1977

[30] Foreign Application Priority Data

Apr. 6, 1977 [JP] Japan .................................. 52-38491

[51] Int. Cl.² ...................... F02B 19/08; F02B 17/00
[52] U.S. Cl. ........................... 123/30 D; 123/32 SP; 123/169 EL; 123/191 S; 313/141
[58] Field of Search ............... 123/30 C, 30 D, 32 C, 123/32 K, 32 L, 32 SP, 32 ST, 33 D, 191 S, 191 SP, 169 EL; 313/141

[56] References Cited

U.S. PATENT DOCUMENTS

| | | | |
|---|---|---|---|
| 2,422,610 | 6/1947 | Bagnulo | 123/32 SP |
| 3,799,140 | 3/1974 | Vogelsang et al. | 123/191 S |
| 3,875,909 | 4/1975 | May | 123/191 S X |

FOREIGN PATENT DOCUMENTS

| | | | |
|---|---|---|---|
| 1,051,186 | 1/1954 | France | 123/32 SP |
| 704,800 | 3/1954 | United Kingdom | 123/30 D |

*Primary Examiner*—Charles J. Myhre
*Assistant Examiner*—Tony M. Argenbright
*Attorney, Agent, or Firm*—Stevens, Davis, Miller & Mosher

[57] ABSTRACT

Disclosed is an internal combustion engine comprising a main chamber and an auxiliary chamber which are interconnected with each other via a connecting passage. The connecting passage is tangentially connected to the inner wall of the auxiliary chamber. A raised portion is formed on the inner wall of the auxiliary chamber at a position located opposite to the inner wall to which the connecting passage is tangentially connected with respect to the axis of the auxiliary chamber. A recess is formed on the inner wall beneath the raised portion. The nozzle of a fuel injector is directed to the recess so as to form a rich air-fuel mixture therein and to form a rich air fuel mixture in the auxiliary chamber. The spark plug has an electrode mounting end face on which the central electrode and the earthing electrode are mounted. The mounting end of the central electrode is covered by an insulator and is disposed in the periphery of the electrode mounting face end. The spark gap of the spark plug is arranged on the periphery of the electrode mounting end face at a position located opposite to the mounting end of the central electrode. The spark plug is disposed in the auxiliary chamber so that the insulator covering the mounting end of the central electrode is directly exposed to a lean air-fuel mixture swirling in the auxiliary chamber, and the spark gap of the spark plug is located in the recess in which a rich air-fuel mixture is formed.

7 Claims, 6 Drawing Figures

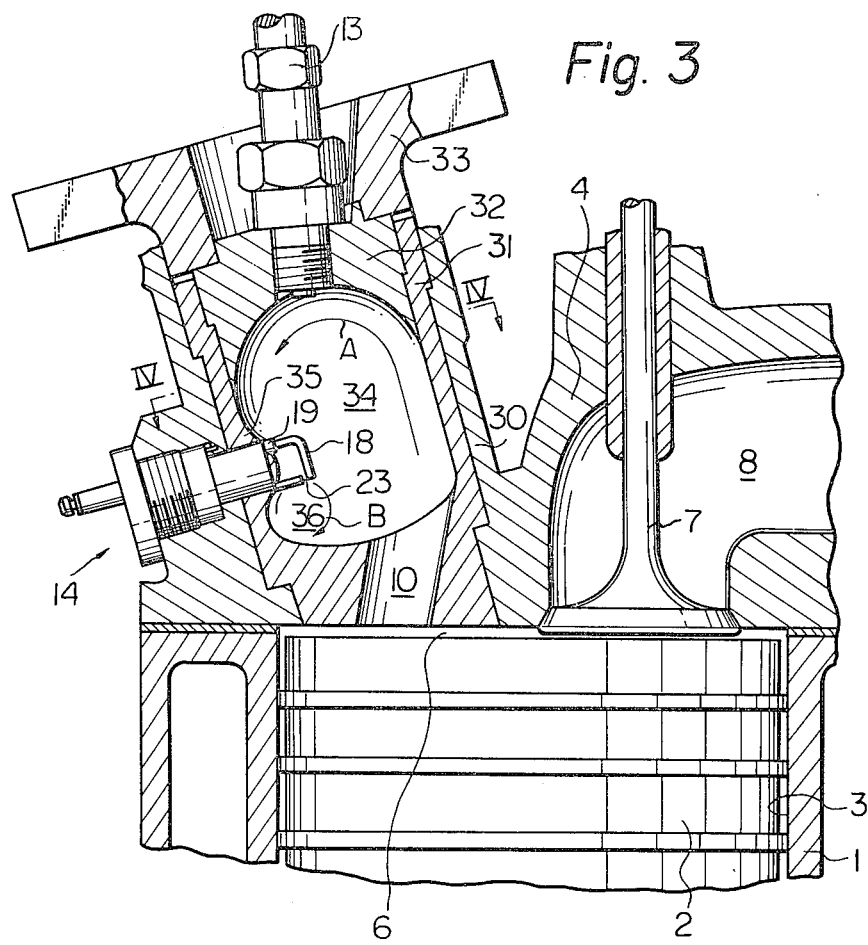

INTERNAL COMBUSTION ENGINE WITH AN AUXILIARY CHAMBER

DESCRIPTION OF THE INVENTION

The present invention relates to an internal combustion engine provided with an auxiliary chamber.

In order to reduce the amount of harmful components in exhaust gas and improve the fuel consumption, it is preferable to use a lean air-fuel mixture. However, the lean air-fuel mixture has a disadvantage in that ignition cannot easily carried out. Consequently, in the case wherein a lean air-fuel mixture is used, a combustible mixture is stratified so as to form a lean air-fuel mixture layer and a rich air-fuel mixture layer in the combustion chamber of the engine and in addition, the spark gap of a spark plug is arranged in the rich air-fuel mixture layer so that the rich air-fuel mixture is ignited by the spark plug, thereby obtaining an ease of ignition.

As such a stratified engine, there has been known an internal combustion engine in which a combustion chamber comprises a main chamber and an auxiliary chamber which are interconnected with each other via a connecting passage. The connecting passage is tangentially connected to the inner wall of the auxiliary chamber, and a recess is formed on the inner wall of the auxiliary chamber at a position located opposite to the inner wall to which the connecting passage is tangentially connected with respect to the axis of the auxiliary chamber. A spark plug and a fuel injector are disposed in the auxiliary chamber so that a rich air-fuel mixture is formed in the recess and a lean air-fuel mixture is formed in the auxiliary chamber by the fuel injected from the fuel injector at the time of ignition. The rich air-fuel mixture thus formed in the recess is ignited by the spark plug.

In an internal combustion engine of this type, the spark plug is located in the recess in which a rich air-fuel mixture is formed. However, if the spark plug is arranged so as to ignite a rich air-fuel mixture as mentioned above, the carbon particles produced at the time of combustion are caused to adhere onto the insulator covering the mounting end of the central electrode of the spark plug. As a result of this, since the electric current is leaked to the body of the spark plug via the carbon particles from the central electrode, a strong spark cannot be obtained. Therefore, it is impossible to supply a rich air-fuel mixture with a satisfactory ignition energy and, as a result, there occurs a problem in that a good combustion cannot be obtained.

An object of the present invention is to provide an internal combustion engine provided with an auxiliary chamber, which is capable of always supplying a rich air-fuel mixture with a strong ignition energy.

According to the present invention, there is provided an internal combustion engine comprising: a cylinder block having a cylinder bore therein; a cylinder head having a cavity therein and mounted on said cylinder block, said cavity having an inner wall which defines an auxiliary chamber with an axis; a piston reciprocally movable in said cylinder bore, said piston and said cylinder head forming a main chamber therebetween; an intake valve movably mounted on said cylinder head for leading gas into said main chamber, an exhaust valve movably mounted on said cylinder head for discharging exhaust gas into the atmosphere; a connecting passage communicating said main chamber with said auxiliary chamber and arranged to be tangentially connected to the inner wall of said auxiliary chamber for creating a strong swirl motion of the gas in said auxiliary chamber at the time of the compression stroke, the inner wall of said auxiliary chamber having a recess at a position located opposite to the inner wall to which said connecting passage is tangentially connected with respect to the axis of said auxiliary chamber; a fuel injector having an injecting nozzle disposed in said auxiliary chamber and directed to said recess for forming a rich air mixture therein and for forming a lean air-fuel mixture in said auxiliary chamber, and; a spark plug having a central electrode and an earthing electrode which define a spark gap therebetween located in said auxiliary chamber, said central electrode having a mounting end covered by an insulator which is arranged to be directly exposed to the swirling stream of a lean air-fuel mixture created in said auxiliary chamber, while the spark gap of said spark plug is located in said recess in which a rich air-fuel mixture is formed.

The present invention may be more fully understood from the following description of preferred embodiments of the invention set forth below, together with the accompanying drawings.

BRIEF DESCRIPTION OF THE DRAWINGS

In the drawings:

FIG. 3 is a cross-sectional side view of another embodiment according to the present invention;

FIG. 4 is a cross-sectional view taken along the line IV—IV in FIG. 3;

DESCRIPTION OF PREFERRED EMBODIMENTS

Figure 1:
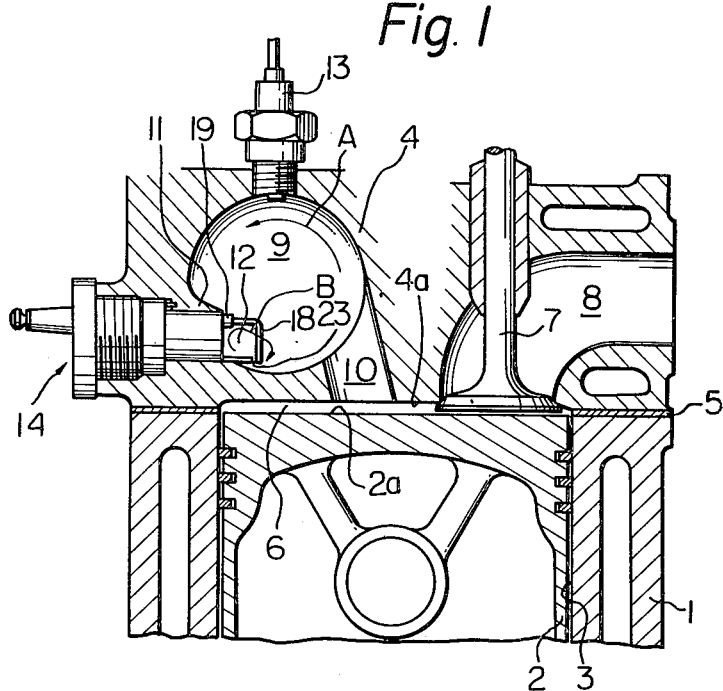
FIG. 1 is a cross-sectional side view of an embodiment of an internal combustion engine according to the present invention.

Referring to FIG. 1, 1 designates a cylinder block, 2 a piston reciprocally movable in a cylinder bore 3 and having a flat top surface 2a, 4 a cylinder head fixed onto the cylinder block 1 via a gasket 5 and having a flat inner wall 4a, and 6 a main chamber formed between the top surface 2a of the piston 2 and the inner wall 4a of the cylinder head 4, 7 designates an intake valve, 8 an intake port, 9 a spherical auxiliary chamber formed in the cylinder head 4 and 10 a connecting passage communicating the auxiliary chamber 9 with the main chamber 6. This connecting passage 10 is tangentially connected to the inner wall of the auxiliary chamber 9. A raised portion 11 is formed on the inner wall of the auxiliary chamber 9 at a position located opposite to the inner wall to which the connecting passage 10 is tangentially connected with respect to the vertical central axis of the auxiliary chamber 9. A recess 12 is formed beneath the raised portion 11. A fuel injector 13 and a spark plug 14 are disposed in the auxiliary chamber 9, and the injecting nozzle of the fuel injector 13 is directed to the recess 12.

Figure 2:
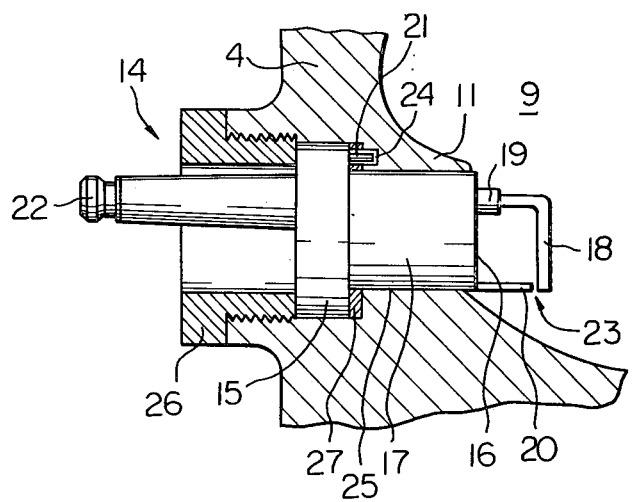
FIG. 2 is an enlarged view of the spark plug shown in FIG. 1.

FIG. 2 shows an enlarged view of the spark plug 14 shown in FIG. 1. Referring to FIG. 2, the spark plug 14 comprises a housing 17 having an increased diameter portion 15 and an electrode mounting end face 16, a central electrode 18, an insulator 19 covering the mounting end of the central electrode 18, an earthing electrode 20, a positioning pin 21 fixed onto the increased diameter portion 15, and a terminal 22. The central electrode 18 is formed in an L shape, and a spark gap 23 is formed between the tip of the central electrode 18 and the earthing electrode 20. The insulator 19 is arranged on the peripheral edge of the electrode mounting end face 16 at a position located opposite to the spark gap 23 with respect to the axis of the spark plug 14. The housing 17 of the spark plug 14 is fitted into a spark plug mounting hole 25 and is fixed onto the cylinder head 4 via a gasket 27 at a predetermined position in such a way that the positioning pin 21 is fitted into a hole 24 formed in the cylinder head 4 and, then, a nut 26 is screwed into the cylinder head 4. In addition, as is shown in FIG. 2, the spark plug 14 is arranged so that the insulator 19 projects into the auxiliary chamber 9 beyond the projecting tip of the raised portion 11 in the vicinity of and beneath the raised portion 11 and, on the other hand, the spark gap 23 of the spark plug 14 is located in the vicinity of the bottom wall the auxiliary chamber 9.

In operation, at the time of the intake stroke, a suction gas such as air or a lean air-fuel mixture, or a suction gas containing a recirculated exhaust gas therein is introduced into the main chamber 6 via the intake valve 7. Then, at the time of the compression stroke, the suction gas introduced into the main chamber 6 is forced into the auxiliary chamber 9 and, as a result, a strong swirl motion as shown by an arrow A is created in the auxiliary chamber 9. On the other hand, a swirl motion as shown by an arrow B is caused in the recess 12 by the strong swirl motion A. The fuel injecting operation of the fuel injector 13 is started when the piston reaches approximately bottom dead center at the beginning of the compression stroke, and said fuel injecting operation is completed when the piston reaches a point corresponding to approximately 120° before top dead center. While a large part of the fuel injected from the fuel injector 13 towards the recess 12 remains in the recess, the remaining small part of the fuel is diffused into the auxiliary chamber 9 and, as a result, a lean air-fuel mixture is formed in the auxiliary chamber 9. On the other hand, as stated previously, the swirl motion B is created in the recess 12. Consequently, the vaporization of the liquid fuel adhering to the inner wall of the recess 12 is promoted by the swirl motion B and by the heat of the inner wall of the recess 12 and, as a result, a rich air-fuel mixture is formed in the recess 12. After this, the rich air-fuel mixture thus formed in the recess 12 is ignited by the spark plug 14. The flame of the rich air-fuel mixture thus ignited propagates into the auxiliary chamber 9 and, thus, the lean air-fuel mixture formed in the auxiliary chamber 9 is burned.

As is shown in FIG. 1, a strong swirl motion A is created in the auxiliary chamber 9 at the time of the compression stroke, and the insulator 19 of the central electrode 18 is directly exposed to this strong swirl motion A of the suction gas. When fuel is injected from the fuel injector 13, the liquid fuel is caused to adhere to the outer surface of the insulator 19 and onto the inner wall of the recess 12. Then, since this liquid fuel is vaporized, a rich air-fuel mixture is formed around the insulator 19. However, since the liquid fuel adhering to the surface of the insulator 19 is instantaneously vaporized by the strong swirl motion A of a lean air-fuel mixture as mentioned above and, then, the fuel vapor thus vaporized is carried away into the auxiliary chamber 9, the mixture located around the insulator 19 becomes a lean air-fuel mixture. Consequently, even if the rich air-fuel mixture in the recess 12 is ignited by the spark plug 14 and, then, the lean air-fuel mixture located around the insulator 19 is ignited, since a lean air-fuel mixture produces carbon particles at the time of combustion, carbon particles are not caused to adhere to the insulator 19. As a result of this, since the entire electric current fed to the central electrode 18 of the spark plug 14 can be used as ignition energy, a strong spark can be always obtained.

FIG. 3 shows another embodiment according the present invention. Referring to FIG. 3, a hole 30 having a circular cross-section is formed in the cylinder head 4, and an auxiliary chamber component 31 is fitted into the hole 30. In addition, another auxiliary chamber component 32 is fitted into the upper end of the auxiliary chamber component 31. The auxiliary chamber components 31 and 32 are rigidly fixed onto the cylinder head 4 by a fixing plate 33 fixed onto the cylinder head 4 by means of bolts (not shown). An auxiliary chamber 34 connected to the main chamber 6 via a connecting passage 10 is formed in the auxiliary chamber components 31 and 32. As is apparent from FIG. 4, the auxiliary chamber 34 has a circular cross-sectional shape. A raised portion 35 is formed on the inner wall of the auxiliary chamber 34 at a position located opposite to the inner wall to which the connecting passage 10 is tangentially connected with respect to the axis of the auxiliary chamber 34. As shown in FIG. 4, the raised portion 35 is formed so as to extend along half of the circumferential inner wall of the auxiliary chamber 34. A recess 36 is formed on the inner wall of the auxiliary chamber 34 beneath the raised portion 35. In the embodiment shown in FIG. 3, in the same manner as described with reference to FIG. 1, at the time of the compression stroke, a strong swirl motion A is created in the auxiliary chamber 34 and a swirl motion B is created in the recess 36. In the embodiment shown in FIG. 3, the spark plug 14 is arranged on the raised portion 35 so that the insulator 19 of the central electrode 18 is directly exposed to the swirl motion A, and the spark gap 23 of the spark plug 14 is located in a rich air-fuel mixture forming region within the recess 36. In this case, since the insulator 19 is directly exposed to a lean air-fuel mixture after the fuel injecting operation of the fuel injector 13 is started, it is possible to prevent carbon particles from adhering to the insulator 19.

Figure 5:
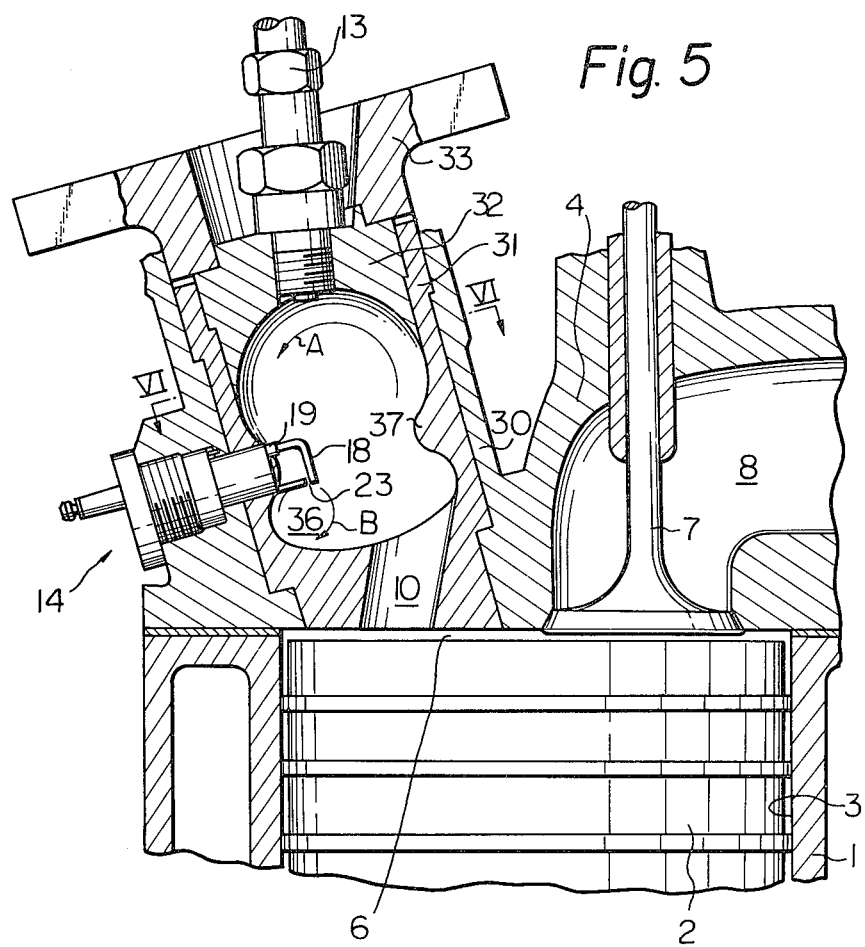
FIG. 5 is a cross-sectional side view of a further embodiment according to the present invention.
Figure 6:
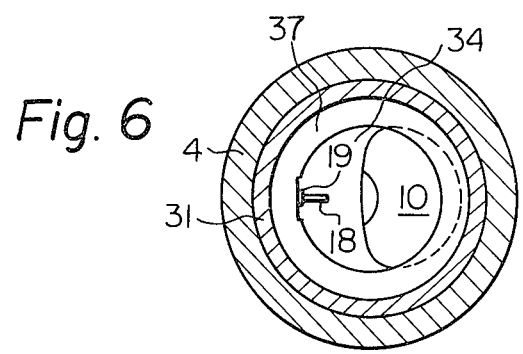
FIG. 6 is a cross-sectional view taken along the line VI—VI in FIG. 5.

FIG. 5 shows a further embodiment according to the present invention. The embodiment shown in FIG. 5 is different from the embodiment shown in FIG. 3 at a point where a raised portion 37 is formed in an annular shape. In the embodiment shown in FIG. 5, in the same manner as described with reference to FIG. 1, a strong swirl motion A is created in the auxiliary chamber 34 and a swirl motion B is created in the recess 36. In this embodiment, the spark plug 14 is arranged on the annular raised portion 37 so that the insulator 19 of the central electrode 18 is directly exposed to the swirl motion A, and the spark gap 23 of the spark plug 14 is located in a rich air-fuel mixture forming region within the recess 36.

According to the present invention, since carbon particles are not caused to adhere to the insulator covering the central electrode of the spark plug, the entire electric current fed to the central electrode can be used as an ignition energy. Therefore, a stong spark can be always obtained and, as a result, a stable combustion can be always obtained.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block having a cylinder bore therein;
   a cylinder head having a cavity therein and mounted on said cylinder block, said cavity having an inner wall which defines an auxiliary chamber with an axis;
   a piston reciprocally movable in said cylinder bore, said piston and said cylinder head forming a main chamber therebetween;
   an intake valve movably mounted on said cylinder head for leading gas into said main chamber;
   an exhaust valve movably mounted on said cylinder head for discharging exhaust gas into the atmosphere;
   a connecting passage communicating said main chamber with said auxiliary chamber and arranged to be tangentially connected to the inner wall of said auxiliary chamber for creating a strong swirl motion of the gas in said auxiliary chamber at the time of the compression stroke, the inner wall of said auxiliary chamber having a recess at a position located opposite to the inner wall to which said connecting passage is tangentially connected with respect to the axis of said auxiliary chamber;
   a fuel injector having an injecting nozzle disposed in said auxiliary chamber and directed to said recess for forming a rich air mixture therein and for forming a lean air-fuel mixture in said auxiliary chamber, and;
   a spark plug having a central electrode and an earthing electrode which define a spark gap therebetween located in said auxiliary chamber, said central electrode having a mounting end covered by an insulator which is arranged to be directly exposed to the swirling stream of a lean air-fuel mixture created in said auxiliary chamber, while the spark gap of said spark plug is located in said recess in which a rich air-fuel mixture is formed.

2. An internal combustion engine as claimed in claim 1, wherein said spark plug has an electrode mounting end face on which said central electrode and said earthing electrode are mounted, said insulator which covers the mounting end of said central electrode being disposed on the periphery of said electrode mounting end face, while the spark gap of said spark plug is arranged on the periphery of said electrode mounting end face at a position located opposite to an axis of said spark plug.

3. An internal combustion engine as claimed in claim 1, wherein a raised portion is formed on the inner wall of said auxiliary chamber, said recess being formed on the inner wall beneath said raised portion.

4. An internal combustion engine as claimed in claim 3, wherein said spark plug is arranged on said raised portion.

5. An internal combustion engine as claimed in claim 3, wherein said spark plug is arranged in said recess.

6. An internal combustion engine as claimed in claim 3, wherein said raised portion is arranged at a position opposite to the inner wall to which said connecting passage is tangentially connected with respect to the axis of said auxiliary chamber.

7. An internal combustion engine as claimed in claim 3, wherein said raised portion is formed in an annular shape along the inner wall of said auxiliary chamber.

* * * * *